(12) United States Patent
Duboc (10) Patent No.: US 6,463,518 B1
(45) Date of Patent: Oct. 8, 2002

(54) GENERATION OF MEMORY ADDRESSES FOR ACCESSING A MEMORY UTILIZING SCHEME REGISTERS

(75) Inventor: Jean Francois Duboc, Saint Laurent du Var (FR)

(73) Assignee: Philips Electronics No. America Corp., New York, NY (US)

( * ) Notice: Subject to any disclaimer, the term of this patent is extended or adjusted under 35 U.S.C. 154(b) by 0 days.

(21) Appl. No.: 09/596,321

(22) Filed: Jun. 19, 2000

(51) Int. Cl.[7] .............................................. G06F 9/35
(52) U.S. Cl. ..................................................... 711/220
(58) Field of Search ................................. 711/200, 220

(56) References Cited

U.S. PATENT DOCUMENTS

| | | | |
|---|---|---|---|
| 4,935,867 A | 6/1990 | Wang et al. ................ | 364/200 |
| 5,357,618 A | 10/1994 | Mirza et al. ................ | 395/400 |
| 5,481,689 A | 1/1996 | Stamm et al. .............. | 395/412 |
| 5,860,155 A | * 1/1999 | Yu .............................. | 711/220 |
| 5,890,222 A | * 3/1999 | Agarwal et al. ............ | 711/220 |
| 5,918,253 A | 6/1999 | Kadowaki ................... | 711/220 |

OTHER PUBLICATIONS

Bat–Sheva, O. et al., *Multiple and Parallel Execution Units in Digital Signal Processors*, DSP Group Ltd., (downloaded at http://www.dspg.com/prodtech/core/article/28.htm), pp. 1–10, (no date).

*Complex Multiply and Accumulate Embedded DSP Macros Product Literature*, Rev C Austria Mikro Systeme International AG, pp. 1–4, (1997).

Tokuzo Kiyohara et al. "Register Connection: A New Approach to Adding Registers into Instruction Set Architectures", *Computer Architecture News*, Association for Computing Machinery, New York, US, vol. 21, No. 2, (May 1, 1993), pp. 247–256, XP000380371, ISSN 013–5964.

* cited by examiner

*Primary Examiner*—Kevin L. Ellis
(74) *Attorney, Agent, or Firm*—Peter Zawilski (57) ABSTRACT

An circuit arrangement and method utilize scheme registers to select among a plurality of indirect address registers from which to retrieve a stored memory address. Rather than identifying within an instruction the location of a particular indirect address register within which is stored an address to be used during processing of the instruction, the instruction specifies the location of a scheme register that identifies which of a plurality of available indirect address registers should be accessed to retrieve a stored address. Scheme registers may be used, for example, in digital signal processing applications to efficiently encode multiple independent addresses within a DSP instruction. Furthermore, while no additional information other than that which identifies an indirect address register may be stored in a scheme register, it may also be possible to store additional information such as post-modification and/or access type information such that independent post-modification and type of access may be specified for different independently-generated addresses.

20 Claims, 3 Drawing Sheets

GENERATION OF MEMORY ADDRESSES FOR ACCESSING A MEMORY UTILIZING SCHEME REGISTERS

FIELD OF THE INVENTION

The invention is generally related to electronic circuit arrangements and integrated circuits incorporating the same, and in particular to address generation logic used to generate addresses for accessing a memory space.

BACKGROUND OF THE INVENTION

As semiconductor fabrication technology advances, designers of integrated circuits are able to integrate more and more functions into a single integrated circuit device, or chip. As such, electronic designs that once required several integrated circuits electrically coupled to one another on a circuit board or module may now be integrated into a single integrated circuit, thereby increasing performance and reducing cost.

One function that has been migrated from discrete circuits to integrated circuits is digital signal processing, which is generally the application of mathematical operations to digitally represented signals. Digital signal processing is utilized in a number of applications, such as to implement filters for audio and/or video signals, to decode information from communications signals such as in wireless or other cellular networks, etc.

Semiconductor fabrication technology has advanced to the point where the logic circuitry that carries out digital signal processing may be carried out by dedicated digital signal processors that execute software programs, referred to herein as DSP programs, to implement specialized DSP algorithms. Moreover, digital signal processors may be embedded in integrated circuits, or chips, with additional logic circuitry to further provide improvements in performance while lowering costs.

Many digital signal processing tasks are characterized by a need to quickly perform repetitive, but relatively simple, mathematical calculations on a large amount of digital data. Multiply-Accumulate (MAC) operations, for example, perform multiplication of two operands and add the result to a running accumulator, and can often be implemented in hardware logic to be performed in a single clock cycle. Multiple MAC units may even be provided so that multiple MAC operations can occur within any given clock cycle. However, some complex filtering operations may require hundreds or thousands of MAC operations to be performed just to calculate one output value at a single point in time.

Given the repetitive nature of many DSP operations, the speed that input data can be retrieved from memory by a digital signal processor, as well as that output data can be written back into memory after being processed (often referred to as memory bandwidth), often has a significant impact on the overall performance of a DSP system.

One manner of increasing memory bandwidth is to utilize multiple communication paths, or buses, to communicate different types of data with a digital signal processor. As an example, a number of conventional DSP designs separate DSP program data and signal data into separate memory spaces, such that separately-accessible program and data memories are used to store DSP program instructions and signal data. Furthermore, digital signal data may be partitioned into multiple memory spaces (often referred to as "X" and "Y" memory spaces) so that multiple data points can be transferred to or from a given memory at a time. Multiple ports, or access paths, into a memory may also be provided, such that multiple access operations can occur in parallel within a given memory.

As an example, a number of conventional DSP designs incorporate dual MAC units, and as such, require four paths into a data memory space (two each in the "X" and "Y" memory spaces) to maintain maximum efficiency. To access four memory locations per cycle, therefore, four addresses must be generated and output to memory in each access cycle.

While generating four addresses typically does not present a significant problem from a circuitry standpoint, encoding four addresses within a processor instruction such as a DSP instruction presents a comparatively greater concern. DSP instructions, like most processor instructions, typically include an opcode field that specifies the type of instruction, and often the addressing mode to be used by the instruction, as well as one or more operand fields that identify either the data to be processed or where such data is located. Since the number of bits required to encode DSP instructions affects the number of instructions available in an instruction set, the Width of the interconnects, logic units, and registers that are required to process those instructions, and the size of the program memory space, it is highly desirable to minimize the number of bits required to encode addresses in any given DSP instruction.

In a number of conventional DSP designs that incorporate dual MAC units, for example, 32-bit instructions are used. For dual MAC operations, 14 bits of a MAC instruction are allocated to opcodes (7 bits for each MAC unit), leaving a total of 18 bits (9 bits for each MAC unit) to specify the locations of the four operands and where to store the results.

Typically, to minimize the number of required bits to encode addresses, a form of indirect addressing is used, where a bank of separate indirect address registers are preloaded with the desired addresses of operands, and where a MAC instruction specifies the locations of one or more indirect address registers from the bank from which to load the desired addresses. Also, it is often desirable to support address post-modification, where the addresses stored in indirect address registers are automatically modified (e.g., incremented or decremented by a fixed value) after the addresses are output from the registers.

Despite the use of indirect addressing, and in part due to the need to support enhancements such as post-modification, it is often not feasible to support the encoding of four independent addresses within a given DSP instruction. As a consequence, a technique known as address correlation is often used, where only two addresses are independently encoded and generated, with the remaining two addresses being generated by modifying the encoded addresses (e.g., by adding fixed offsets to the encoded addresses).

As an example, one of the aforementioned conventional DSP designs utilizes indirect-address MAC instructions having the following syntax:

$$\text{MAC } (r_i)\text{+postmod},(r_j)\text{+postmod},a_m \| \text{MAC } (r_{i^\sim}),(r_{j^\sim}),a_n$$

where $(r_i)$ and $(r_j)$ are specify indirect addressing via selected indirect address registers $r_i$ and $r_j$, postmod specifies the post-modification to apply to each stored address, $a_m$ and $a_n$ specify the accumulators to add the results to, and $(r_{i^\sim})$ and $(r_{j^\sim})$ specify the correlated addresses.

The above MAC instruction is encoded in a 32-bit instruction as shown in table I below:

TABLE I

Conventional Dual MAC Instruction
Encoding (Indirect Addressing)

| Field | Bits (per MAC) | Total Bits |
|---|---|---|
| MAC opcode | 7 | 14 |
| Destination accumulator (4 available) | 2 | 4 |
| $r_i$ indirect address register (4 available) | 2 | 2 |
| $r_j$ indirect address register (4 available) | 2 | 2 |
| $r_i$ post-modification (7 types) | 3 | 3 |
| $r_j$ post-modification (7 types) | 3 | 3 |
| $r_i$ modification for X correlated addr (4 types) | 2 | 2 |
| $r_j$ modification for Y correlated addr (4 types) | 2 | 2 |

Other types of instructions may also use the aforementioned techniques to generate four addresses in a given cycle. A number of drawbacks, however, exist with respect to the use of such techniques.

First, the use of correlated addressing significantly limits the data organization inside the data memory space, since the data needs to be carefully organized to ensure that the data addressed via the correlated addresses is arranged in appropriate offsets from the data addressed via the encoded addresses. Often, hand optimization of program code is also required to minimize the number of processor cycles lost to inefficient data transfer.

Second, the aforementioned techniques typically only support either all reads or all writes to the independent and correlated addresses. Non-standard combinations such as 3 reads and 1 write, 3 writes and 1 read, etc., are typically not supported. As a consequence, if any such combinations are required, multiple instructions are typically required to process such combinations serially instead of in parallel. In addition to slower processing due to the need for additional instructions, valuable memory bandwidth is underutilized at times, thereby reducing the throughput of the processor below its maximum operating efficiency.

Therefore, a significant need continues to exist in the art for a manner of minimizing the number of bits required to generate and access multiple memory addresses with a processor instruction.

SUMMARY OF THE INVENTION

The invention addresses these and other problems associated with the prior art by providing a circuit arrangement and method that utilize "scheme" registers to select among a plurality of indirect address registers from which to retrieve a stored memory address. As such, rather than identifying within an instruction the location of a particular indirect address register within which is stored an address to be used during processing of the instruction, an instruction may specify the location of a scheme register that identifies which of a plurality of available indirect address registers should be accessed to retrieve a stored address. The second level of indirection provided by scheme registers provides significantly greater flexibility in terms of generating multiple independent addresses with a minimal number of bits in an instruction.

For example, while the invention is not limited solely to digital signal processing applications, the invention does provide in such applications the ability to efficiently encode multiple independent addresses within a given DSP instruction. For a dual MAC application, as an example, four independent addresses may be generated by storing the four addresses in separate indirect address registers, and then identifying the four different indirect address registers within four different scheme registers, such that the four independent addresses may be retrieved by identifying the four scheme registers.

In addition, while a scheme register consistent with the invention may store nothing more than a location or identification of an indirect address register to be used to generate an address, in some embodiments additional information may be stored within a scheme register to provide enhanced functionality, and further maximize the efficiency of processor instructions. For example, it may be desirable to store post-modification information in a scheme register such that independent post-modification operations may be performed on each independently-generated address. Furthermore, it may be desirable to store access type information within a scheme register, e.g., specifying whether an operation is a read or write operation, such that separate types of accesses may be performed with each separate independently-generated address.

Therefore, consistent with one aspect of the invention, a circuit arrangement is provided, including a plurality of indirect address registers, each configured to store an address pointer, and a plurality of scheme registers, each configured to store an indirect address register selector that selects a selected indirect address register from the plurality of indirect address registers. The circuit arrangement further includes address generation logic that is configured to, in response to an instruction that selects a selected scheme register from the plurality of scheme registers, generate a memory address for use in accessing a memory from the address pointer stored in the selected indirect address register selected by the indirect address register selector stored in the selected scheme register.

Consistent with another aspect of the invention, a method of accessing a memory is provided. The method includes receiving an instruction that selects a selected scheme register from a plurality of scheme registers, accessing the selected scheme register to obtain an indirect address register selector that selects a selected indirect address register from a plurality of indirect address registers, accessing the selected indirect address register to obtain an address pointer stored therein, and accessing a memory using the address pointer.

These and other advantages and features, which characterize the invention, are set forth in the claims annexed hereto and forming a further part hereof. However, for a better understanding of the invention, and of the advantages and objectives attained through its use, reference should be made to the Drawings, and to the accompanying descriptive matter, in which there is described exemplary embodiments of the invention.

DETAILED DESCRIPTION

The herein described embodiments utilize scheme registers to minimize the number of bits required to generate multiple independent addresses using a processor instruction. A scheme register consistent with the invention is utilized to store an addressing "scheme" or law to be used by an address generator in generating one or more addresses. Included within a scheme register is typically a selector that identifies one of a plurality of available indirect address registers from which an indirect address pointer may be retrieved for use in generating an address (which may or may not be subsequently modified prior to accessing a memory with the address). In addition, a scheme register may optionally incorporate additional information related to an addressing scheme, including, for example, post-modification information (e.g., identifying step information or a step register within which such information is stored and/or identifying modulus information or a modulo register within which such information is stored) and/or access type information (e.g., read or write, among other possible access types). Other information pertinent to an addressing scheme may also be stored in a scheme register consistent with the invention.

The discussion hereinafter will focus on one particular application of the invention in the encoding of multiple addresses into an instruction for the purposes of generating multiple independent addresses for use in performing parallel memory accesses in a DSP environment. In particular, the discussion hereinafter focuses on the generation of four independent addresses for use in performing four parallel accesses to X and Y data memories in a DSP processor. It will be appreciated, however, that the invention is not limited to this particular application, and as such, other environments, including both DSP and non-DSP environments (e.g., classical microprocessing environments) may utilize the unique addressing schemes described herein consistent with the invention.

Figure 1:
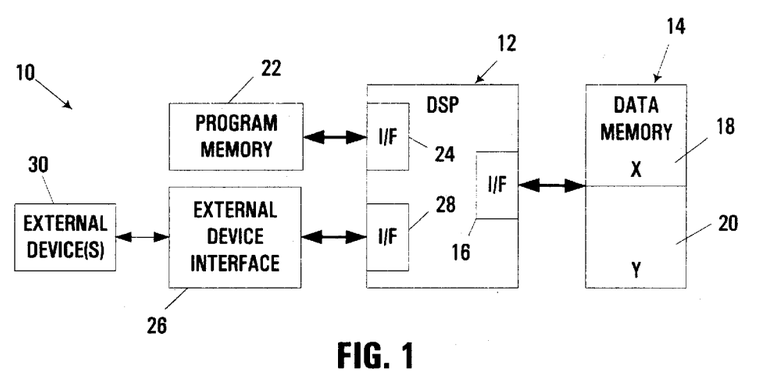
FIG. 1 is a block diagram of a digital signal processor (DSP) circuit arrangement consistent with the invention.

Turning to the Drawings, wherein like numbers denote like parts throughout the several views, FIG. 1 illustrates a circuit arrangement 10 consistent with the invention. In the illustrated implementation, circuit arrangement 10 is disposed on a single integrated circuit device, or chip, although various components in circuit arrangement 10 may also be implemented on separate chips in other embodiments. Circuit arrangement 10 includes a digital signal processor (DSP) 12 interfaced with a data memory 14 via a data bug interface 16. Data memory 16 may be partitioned into one or more data spaces, e.g., X and Y data spaces 18, 20 as shown in FIG. 1, and as will become more apparent below, each data space 18, 20 includes two separate memory paths, or ports, which permit parallel access of two memory locations in each data space (typically denoted as X1 and X2 for the X data space, and denoted as Y1 and Y2 for the Y data space).

DSP 12 is also provided with interfaces to additional memory devices. Program code, for example, is stored in a program memory 22 coupled to DSP 12 via an interface 24. External connectivity to the DSP 12 is provided by an external device interface 26 interfaced to DSP 12 via interface 28. External device interface provides an interface to one or more external devices, identified at 30. The external devices may be disposed on the same integrated circuit, or may be external to the circuit and in electrical communication therewith. Examples of types of external devices that may be accessed in this manner include analog to digital or digital to analog converters working at low frequency versus DSP frequency, debug ports, chip configuration registers which are read or written during the chip initialization phase, communication ports (serial or parallel) to a host computer or any other hardware resource that does not require a high frequency.

Each of interfaces 16, 24 and 28 typically includes termination points to couple to the respective buses, as well as appropriate buffer and control logic to implement the necessary interface with the appropriate bus.

It will be appreciated that circuit arrangement 10 is but one of many possible environments for the utilization of scheme registers consistent with the invention. Therefore, the invention is not limited to the particular environment discussed herein. As but one example, the invention may be used in generating memory addresses used to access practically any type of memory, including memories implemented with nonvolatile and volatile solid state memory devices, memories implemented with mass storage devices, memories incorporated onto the same integrated circuit device or external to circuit arrangement 10. Moreover, multiple memory addresses may be generated for use within the same memory space or partition, or within different memory spaces or partitions. Further, a memory may be considered to incorporate any number of physical devices, as well as any combination of memory levels in a multi-level memory hierarchy. Other forms of memory access suitable for use in connection with the invention will be apparent to one of ordinary skill in the art having the benefit of the instant disclosure.

Moreover, it will also be appreciated that circuit arrangement 10 is typically implemented on one or more integrated circuit devices, or chips, and that such integrated circuit devices are typically designed and fabricated using one or more computer data files, referred to herein as hardware definition programs, that define at various levels of detail the functionality and/or layout of the circuit arrangements on the devices. The programs are typically generated by a design tool and are subsequently used for simulation and/or during manufacturing to create the layout masks that define the circuit arrangements applied to a semiconductor wafer. Typically, the programs are provided in a predefined format using a hardware definition language (HDL) such as VHDL, Verilog, EDIF, etc. Thus, while the invention has and hereinafter will be described in the context of circuit arrangements implemented in fully functioning integrated circuit devices and data processing systems utilizing such devices, those of ordinary skill in the art having the benefit of the instant disclosure will appreciate that circuit arrangements consistent with the invention are capable of being distributed as program products in a variety of forms, and that the invention applies equally regardless of the particular type of signal bearing media used to actually carry out the distribution. Examples of signal bearing media include but are not limited to recordable type media such as volatile and non-volatile memory devices, floppy disks, hard disk drives, CD-ROM's, and DVD's, (among others), and transmission type media such as digital and analog communications links.

Figure 2:
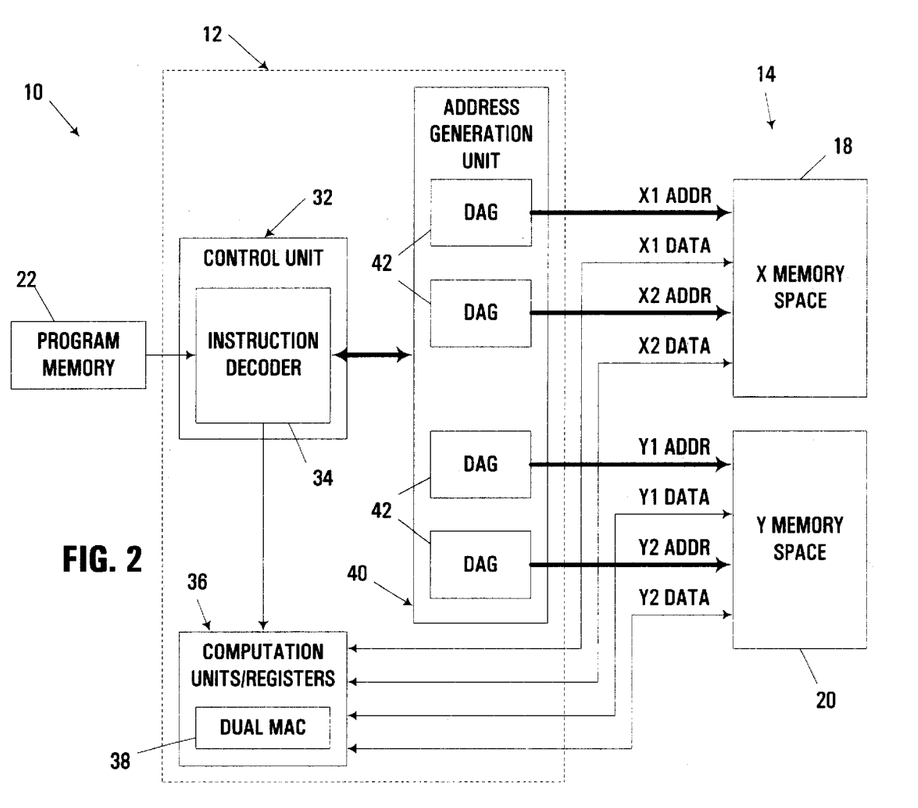
FIG. 2 is a block diagram of the principal components used for address generation in the DSP circuit arrangement of FIG. 1.

The principle components involved in address generation in circuit arrangement 10 are illustrated in greater detail in FIG. 2. In particular, DSP 12 is illustrated as including a control unit 32 with an instruction decoder 34 configured to receive instructions from program memory 22. In response to a decoded instruction, decoder 34 generates control signals to manipulate a complex of computation units and registers 36, among which include a dual Multiply-Accumulate (MAC) unit 38. The computation units and registers are coupled to the X and Y memory spaces 18, 20 through a plurality of memory buses, X1, X2, Y1 and Y2. The data lines of each of the memory buses are coupled between block 36 and each of the X and Y memory spaces 18, 20, typically using bi-directional lines, or alternatively, using pairs of mono-directional lines. The address lines for each of the memory buses are driven by an address generation unit 40, which is under the control of control unit 32. To provide the ability to generate four independent addresses, a plurality of data address generators (DAG) 42 are provided within address generation unit 40. In response to appropriate control signals from instruction decoder 34, one or more of the DAG 42 are controlled to output addresses over the X1, X2, Y1 and/or Y2 memory buses. Address generation unit 40 typically supports multiple addressing modes, including a form of indirect addressing mode that utilizes scheme registers consistent with the invention. In addition, address generation unit 40 typically supports a number of additional, conventional addressing modes, e.g., direct addressing, indirect addressing (without the use of scheme registers), immediate addressing, etc. Moreover, address generation unit 40 is typically configured to additional enhancements to the aforementioned addressing modes, including functions such as post-modification, bit reverse and modulus functions. It will be appreciated that other address generation features may also be supported in address generation unit 40, including, for example, indexed addressing mode, stack addressing mode, etc. Given, however, that the configuration of an address generation unit (as well as other logic circuitry associated with address generation, e.g., instruction decoders) for the purpose of supporting such conventional addressing modes and enhanced functions is well known in the art, further details regarding the implementation of such conventional addressing modes and enhanced functions in circuit arrangement 10 are not provided herein. As an example, such addressing modes and features are implemented in DSP architectures such as the PalmDSPCore architecture from DSP Group, Inc., the use and configuration of which is well known in the art.

Figure 3:
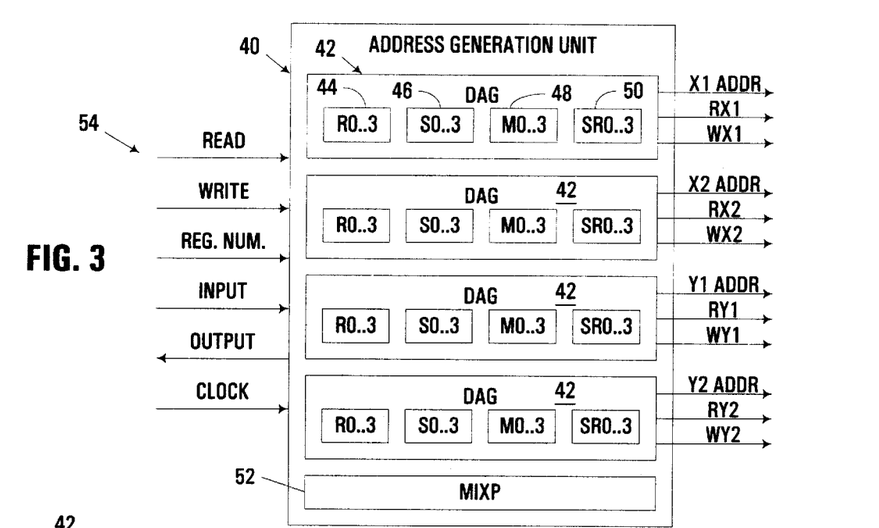
FIG. 3 is a block diagram of the registers and control inputs utilized in initializing such registers in the address generation unit in the DSP circuit arrangement of FIG. 2.

FIG. 3 illustrates the principle registers implemented within address generation unit 40 to implement the various addressing modes supported by DSP 12. In particular, each DAG 42 includes a set of indirect address registers 44, a set of step registers 46, a set of modulo registers 48 and a set of scheme registers 50. In addition, a min/max register (MIXP) register 52 is also provided in address generation unit 40, and is utilized to indicate the address of a new minimum or maximum instruction executed by the DSP. The use and configuration of a min/max register 52 is well known in the art, and thus, the implementation of such functionality in unit 40 will not be discussed in any further detail herein.

In the illustrated embodiment, each DAG 42 includes four each of the indirect address registers 44 (R0 . . . 3), step registers 46 (S0 . . . 3), modulo registers 48 (M0 . . . 3) and scheme registers 50 (SR0 . . . 3), thereby providing a total of 16 of each such register type. Each DAG 42 is also configured to output an appropriate address over address lines of a bus, as well as a READ or WRITE signal (e.g., RX1 and WX1 for the X1 memory bus).

Further in the illustrated embodiment, each register is separately accessible by the instruction decoder through a series of control signals 54. With 65 total registers, a total of seven bits are required to separately address each register in the address generation unit. Therefore, to provide an interface between the instruction decoder and the address generation unit, a REGISTER NUMBER signal of 7-bits in width is provided to the address generation unit to select one of the 65 available registers. Reading the contents of a register or writing new contents to a register are controlled via READ and WRITE signals, with the contents of a register in response to a read access provided over an OUTPUT bus, and with new data written into a register during a write access provided over an INPUT bus. Address generation unit 40 is also configured to receive a CLOCK signal to synchronize the various control signals and permit the instruction decoder to control address generation unit 40.

Each register 44, 46, 48 and 50 can have any number of varying widths. Typically, each indirect address register 44 has a width equal to the size of the memory space. As an example, the illustrated embodiment may utilize a 64KB memory space (32KB for each of the X and Y memory spaces, with two independent banks provided within each memory space to support two concurrent accesses per memory space), whereby each register 44 is typically 16-bits in width.

Each modulo register 48 also typically includes a width equal to twice the size of the memory space so that a modulo address and buffer size may be stored therein. Also, for a 64K memory space, each step register 46 and scheme register 50 may also be 16-bits in width; however, in many instances, 16-bits of information will not be required, and as such, each of these registers may be smaller in width to conserve the space occupied by the circuit arrangement on an integrated circuit device.

To initialize any of registers 44–50, typically a register is selected via its unique register number by asserting the unique register number on the REGISTER NUMBER control lines. Data to write into the selected register is asserted on the INPUT lines. Then, when the WRITE signal is asserted, the asserted data is written into the selected register on the next clock cycle. Reading the contents of a register is performed via a complementary operation utilizing the OUTPUT lines and READ signal in association with the REGISTER NUMBER lines.

Figure 4:
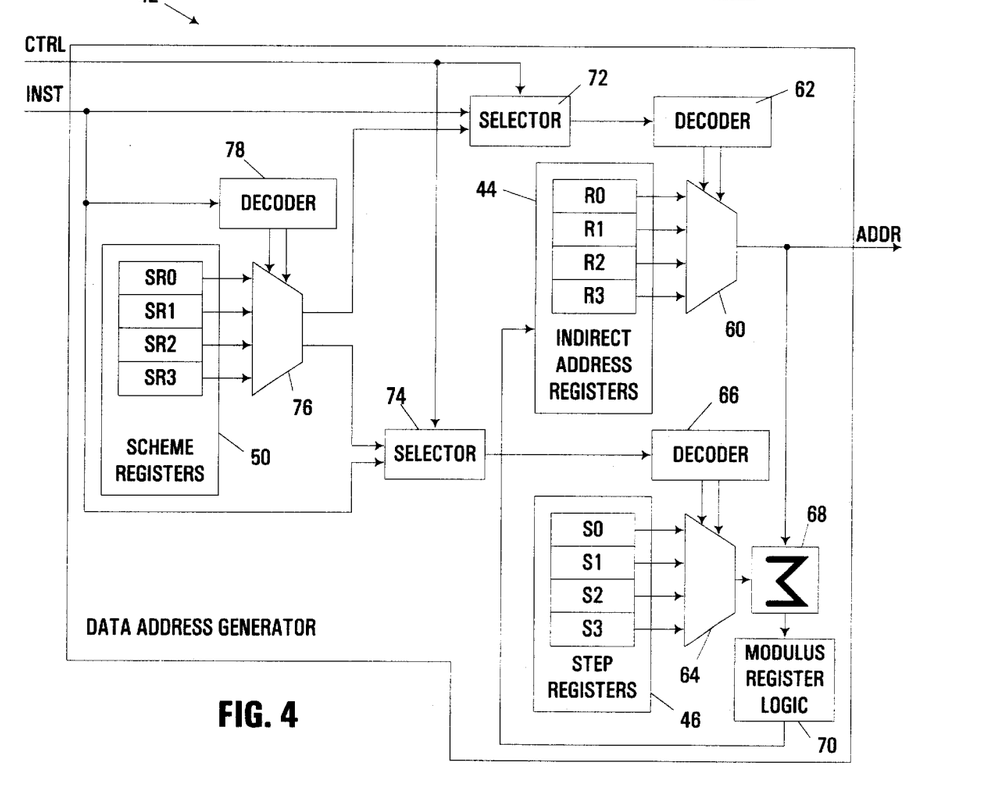
FIG. 4 is a block diagram of one of the data address generators in the address generation unit of FIG. 3.

FIG. 4 illustrates an exemplary implementation of one of DAG's 42 in greater detail. DAG 42 of FIG. 4 is illustrated as being responsive to an instruction signal (INST) and a control signal (CTRL) output by the instruction decoder. DAG 42 is also illustrated as outputting an address signal (ADDR). Additional control signals, which are not particularly material to the additional indirect addressing mode specifically described herein, have been omitted for clarity.

The indirect address registers 44, which store indirect address pointers, are coupled to a multiplexer 60 controlled via a decoder 62. Step registers 46 are likewise coupled to a multiplexer 64 under the control of a decoder 66. The output of a selected indirect address pointer is therefore provided by multiplexer 60 based upon the control signals applied by decoder 62, thereby generating the output address ADDR. For the purpose of post-modification, the output address is also provided to a summer 68 that receives a selected offset stored in one of the step registers 46 and selected via multiplexer 64 and decoder 66. Each step register may include, for example, a NULL value (representing no post-modification), a positive offset or a negative offset. The output of summer 68 is the sum of the output address and the contents of the selected step register, which is passed to modulus register logic 70 to perform an optional modulus calculation (if such a mode is selected for the current instruction). Each of the modulo registers 48 is implemented within modulus register logic 70, with the logic being utilized to "roll over" the address once the address exceeds a predetermined maximum address.

Modulus addressing, which is well understood in the art, generally implements a circular buffer in the memory space. Any number of known modulus algorithms may be used in the illustrated embodiment. For example, it may be desirable to store within a modulus register both a starting address and a length representing the size of the circular buffer to be implemented. The modulus register logic would then compare the output of summer 68 with the sum of the starting address and length. If the output of summer 68 is less than the sum, the output is passed unchanged from logic 70. Otherwise, the starting address specified in the selected modulo register is output as the result of logic 70. Other modulus addressing schemes may also be used in the alternative, and modulus addressing may also be omitted in some embodiments. Furthermore, the implementation of different modulus algorithms in an address generation unit is well within the abilities of one of ordinary skill in the art having the benefit of the instant disclosure, and thus will not be discussed further herein.

The output of logic 70 is provided back to the indirect address registers 44 such that the modifications made to the output address are saved in the currently-selected indirect address register to post-modify the stored address pointer.

As discussed above, two different indirect addressing modes are supported by each DAG 42. A first indirect addressing mode does not utilize the scheme registers, but rather utilizes information encoded within an instruction to select an indirect address register, and optionally, a step register. In a second addressing mode, the scheme registers 50 are utilized to select each of an indirect address register and a step register based upon the contents of a selected register select register. Which of these modes is used is controlled via a pair of selectors 72 and 74, which control the selection of the indirect address registers and step registers via decoders 62 and 66. Selector 72 receives as input the INST signal from the instruction decoder, as well as an additional input received from a multiplexer 76 under the control of a decoder 78. Multiplexer 76 is configured to receive the contents of the scheme registers 50 and output the contents of one of such registers to selector 72.

Depending on which indirect addressing mode is used (as encoded into the current instruction), the CTRL signal is selectively asserted or deasserted to control selector 72 to select either the instruction decoding information provided in the INST signal from the instruction decoder or the output of a scheme register as the control signal for selecting one of the indirect address registers used to generate the output address for the DAG. The CTRL signal is also used to control selector 74 to output either the step register selection information generated in an instruction in the first indirect addressing mode, and provided by the INST signal, or alternatively, step register selection information stored in a scheme register, to decoder 66 for selection of an appropriate step register.

Thus, it may be seen that, depending on the indirect addressing mode selected, either the content of a selected scheme register or the content of an instruction is used to select each of an indirect address register and a step register for use in generating and post-modifying an output address consistent with the invention.

Figure 5:
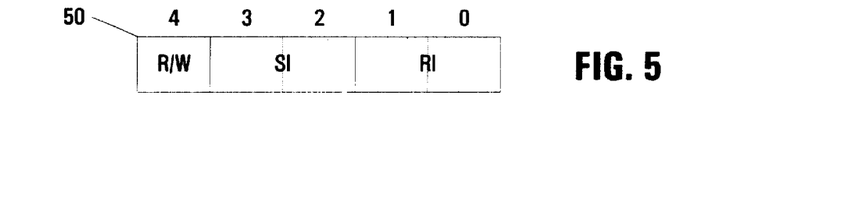
FIG. 5 illustrates an exemplary configuration of a scheme register in the data address generator of FIG. 4.

FIG. 5, for example, illustrates an exemplary format for a scheme register 50 from the set of such registers in DAG 42 of FIG. 4. In the illustrated implementation, register 50 may be implemented using as few as 5 bits, or additional bits may be provided but set to null if unused. Two bits select an indirect address register ($r_i$) among the four available, with an additional 2 bits selecting one of four step registers ($s_i$). The fifth bit is used to select an access type, in this case, a READ or WRITE operation. In the second indirect addressing mode, the contents of the access type bit are used to selectively drive either of the READ or WRITE signals onto the appropriate address bus.

It will be appreciated that a wide variety of alternate formats may be utilized in each scheme register consistent with the invention. For example, when a different number of available registers are provided for any given type, a different number of bits may be allocated for selecting any of such registers (e.g., three bits to select among as many as eight indirect address registers). Moreover, in some implementations, no step register selection field may be required, or step information may be directly stored in a scheme register, rather than identifying a separate step register. In still other implementations, additional access type information may be stored, e.g., to select different priority accesses, etc., whereby the access type field may comprise additional bits. In other embodiments, no access type field may be used. Additional information, e.g., bit reverse information, modulus information (e.g., a modulo register selector, or modulus address and/or size information), etc., may also be provided in each scheme register in some implementations.

Figure 6:
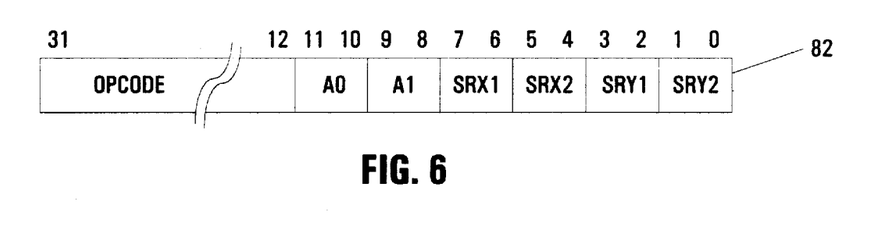
FIG. 6 illustrates an exemplary DSP instruction format for use in the DSP circuit arrangement of FIG. 1.

With the configuration illustrated in FIGS. 1–5, an extremely efficient and compact indirect addressing scheme may be utilized to generate four independent addresses with a minimal number of bits in an instruction. As an example, FIG. 6 illustrates an exemplary instruction syntax 82 suitable for implementing a dual MAC instruction. Other instructions that may require the generation of four independent addresses may incorporate a similar format.

As shown in FIG. 6, selection of four scheme registers may be specified with only 8 bits, two for each memory bus to select among the four available scheme registers allocated to such bus. In addition, with an additional 2 bits each to specify result accumulators, it may be seen that the operands for a dual MAC or like instruction may be specified with only twelve bits, leaving, for example, 20 full bits in a 32-bit instruction for the opcodes and other required information.

It will be appreciated that a wide variety of alternate instruction formats may be used, and therefore, the invention is not limited to the particular format described herein.

To utilize the second addressing mode in a DSP algorithm, typically a DSP program is required to initialize the appropriate indirect address registers, step registers, and scheme registers necessary to implement the desired functionality. Such initialization is performed using the interface described above in connection with FIG. 3. Then, when it is desirable to perform memory accesses using the scheme register indirect addressing mode, instructions providing the selection of the scheme registers for each memory bus are provided.

One significant advantage of the use of scheme registers in the manner described herein results from one of the most notable characteristics of signal processing: the regularity. In particular, data ordering in a memory is typically always the same, and in many instances the four addresses required in such an addressing mode are needed in a loop where performance requirements are at a maximum and any lost cycles are important. Also, in a signal processing loop, a processor typically accesses a data array with a regular addressing law. The use of scheme registers essentially enables this law to be programmed into a scheme register at the beginning of a loop such that during the loop execution, the program code is not required to provide information such as access type and/or post-modification information within each instruction. By omitting the need to provide access type and/or post-modification information in an instruction permits a much more compact instruction, as well as permits a maximization of system resources.

Figure 7:
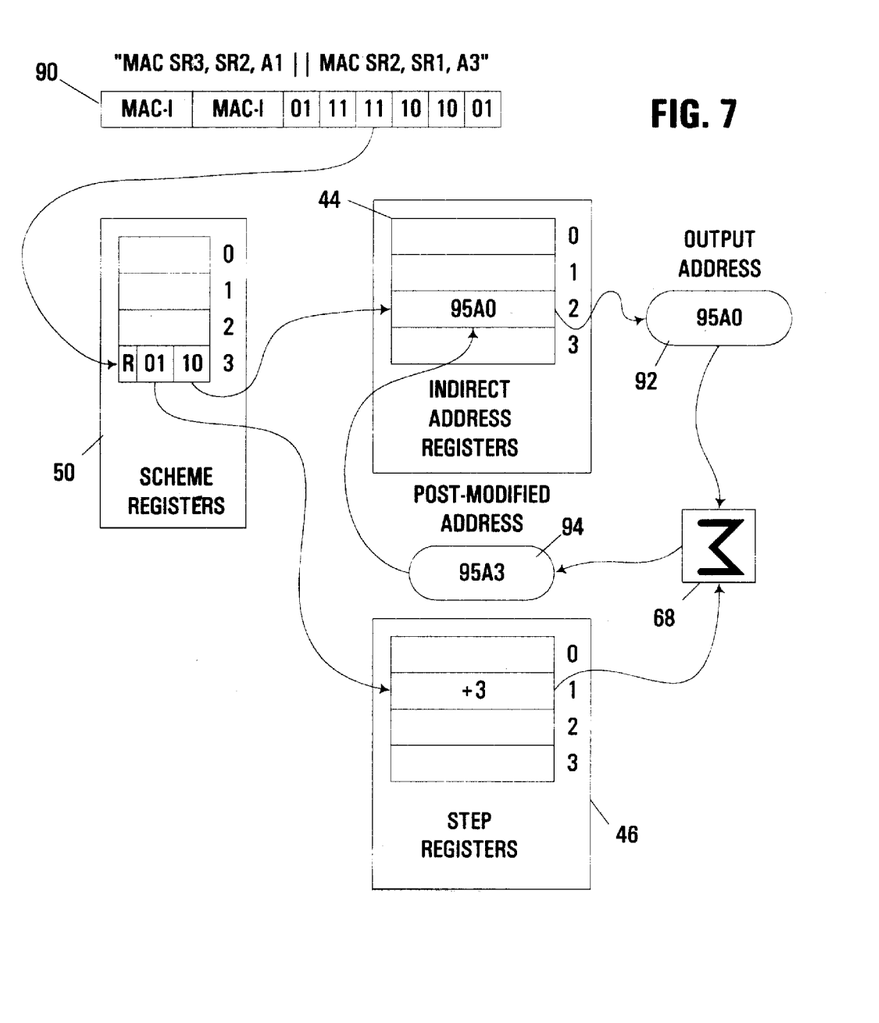
FIG. 7 illustrates an exemplary indirect memory access performed by the DSP circuit arrangement of FIG. 1.

An exemplary memory access utilizing the scheme register indirect addressing mode described above is illustrated in greater detail in FIG. 7. An exemplary instruction 90, having the form of "MAC SR3, SR2, A1 || MAC SR2, SR1, A3" is illustrated. The binary representation of the instruction includes opcodes for each MAC instruction, as well as selection of the A1 and A3 accumulators for receiving the results (assuming a total of four accumulators are supported for each MAC), and selection of the SR3 and SR2 scheme registers for the first MAC instruction, and selection of the SR2 and SR1 scheme registers for the second operation. FIG. 7 specifically illustrates the address generation for the X1 memory bus, where scheme register SR3 is specified in instruction 90. For the purposes of illustration, it is assumed that the scheme register SR3 has stored therein a "READ" access type, with a selection of step register S1 and indirect address register R2. Stored within step register S1 is a step value of +3, and stored within indirect address register R2 is a pointer to a hexadecimal address "95A0". As a result, in response to instruction 90, generation of an address for bus X1 proceeds by selecting scheme register SR3, resulting in the selection of indirect address register R2, and further resulting in the output as the output address 92 of the contents of register R2, the address "95A0". In addition, post-modification is performed by combining the output address in summer 68 with the offset stored in step register S1, resulting in a post-modified address 94 of "95A3". The post-modified address is then stored back into indirect address register R2. As such, on the next access that specifies scheme register SR3, the output address will be the new contents of indirect address register R2.

The herein described embodiments provide a number of advantages over conventional designs. As discussed above, the use of scheme registers permits multiple independent addresses to be generated in parallel with a minimum number of bits in an instruction. In addition, by increasing the ability to generate independent addresses in a compact instruction, limitations associated with generating correlated addresses are avoided. In addition, in many instances address decoding is significantly simplified over conventional designs. Moreover, the additional logic required to implement the scheme registers and control logic therefor is comparatively minimal to the size of the overall DSP circuit arrangement.

Furthermore, the ability to supply separate step information in each scheme register permits independent post-modification operations to be performed for generated address, providing additional flexibility in terms of memory organization. The ability to supply separate access information in each scheme register also permits any combination of access types to be supported, e.g., 4 reads/0 writes, 3 reads/1 write, 2 reads/2 writes, etc., thereby permitting memory bandwidth to be maximized.

Various modifications may be made to the illustrated embodiments without departing from the spirit and scope of the invention. For example, any number of concurrent address generators, as well as any number of scheme registers, indirect address registers, step registers and/or modulo registers may be supported in various designs. Also, additional functionality, e.g., write conflict logic that prohibits concurrent writes to the same memory address, may also be supported.

Other modifications will be apparent to one of ordinary skill in the art. Therefore, the invention lies in the claims hereinafter appended.

What is claimed is:

1. A circuit arrangement, comprising:
    (a) a plurality of indirect address registers, each configured to store an address pointer;
    (b) a plurality of scheme registers, each configured to store an indirect address register selector that selects a selected indirect address register from the plurality of indirect address registers; and
    (c) address generation logic configured to, in response to an instruction that selects a selected scheme register from the plurality of scheme registers, generate a memory address for use in accessing a memory from the address pointer stored in the selected indirect address register selected by the indirect address register selector stored in the selected scheme register.

2. The circuit arrangement of claim 1, wherein each scheme register is further configured to store post-modification information, and wherein the address generation logic is further configured to modify the address pointer stored in the selected indirect address register using the post-modification information stored in the selected scheme register.

3. The circuit arrangement of claim 2, further comprising a plurality of step registers, each storing post-modification information, wherein each scheme register is configured to store a step register selector that selects a selected step register from the plurality of step registers, wherein the address generation logic is configured to modify the address pointer stored in the selected indirect address register by using the post-modification information stored in the selected step register selected by the step register selector from the selected scheme register.

4. The circuit arrangement of claim 1, wherein each scheme register is further configured to store access type information, and wherein the address generation logic is further configured to use the generated memory address in performing a memory access of the type specified by the access type information in the selected scheme register.

5. The circuit arrangement of claim 4, wherein the access type information in the selected scheme register selects one of a plurality of access types including a read access type and a write access type.

6. The circuit arrangement of claim 1, further comprising:
    (a) a second plurality of indirect address registers, each configured to store an address pointer to the memory; and
    (b) a second plurality of scheme registers, each configured to store an indirect address register selector that selects a selected indirect address register from the second plurality of indirect address registers;
wherein the instruction further selects a second selected scheme register from the second plurality of scheme registers, and wherein the address generation logic is further configured to, in response to the instruction, generate a second memory address for use in accessing the memory from a second address pointer stored in the selected indirect address register from the second plurality of indirect address registers selected by the indirect address register selector stored in the second selected scheme register.

7. The circuit arrangement of claim 6, further comprising a multiply-accumulate (MAC) unit, and wherein the instruction comprises a MAC instruction.

8. The circuit arrangement of claim 7, further comprising:
(a) a second MAC unit;
(b) third and fourth pluralities of indirect address registers, each configured to store an address pointer to the memory;
(c) a third plurality of scheme registers, each configured to store an indirect address register selector that selects a selected indirect address register from the third plurality of indirect address registers; and
(d) a fourth plurality of scheme registers, each configured to store an indirect address register selector that selects a selected indirect address register from the fourth plurality of indirect address registers;
wherein the instruction comprises a dual MAC instruction that additionally selects third and fourth selected scheme registers, and wherein the address generation logic is further configured to, in response to the instruction, generate third and fourth memory addresses using the third and fourth selected scheme registers.

9. An integrated circuit device comprising the circuit arrangement of claim 1.

10. A program product comprising a hardware definition program that defines the circuit arrangement of claim 1, and a signal bearing medium bearing the program.

11. A method of accessing a memory, the method comprising:
(a) receiving an instruction that selects a selected scheme register from a plurality of scheme registers;
(b) accessing the selected scheme register to obtain an indirect address register selector that selects a selected indirect address register from a plurality of indirect address registers;
(c) accessing the selected indirect address register to obtain an address pointer stored therein; and
(d) accessing a memory using the address pointer.

12. The method of claim 11, wherein each scheme register is further configured to store post-modification information, the method further comprising modifying the address pointer stored in the selected indirect address register using the post-modification information stored in the selected scheme register.

13. The method of claim 12, wherein the post-modification information in the selected scheme register includes a step register selector that selects a selected step register from a plurality of step registers, each of which stores post-modification information, wherein modifying the address pointer includes accessing the selected step register.

14. The method of claim 11, wherein each scheme register is further configured to store access type information, and wherein accessing the memory includes performing a memory access of the type specified by the access type information in the selected scheme register.

15. The method of claim 14, wherein the access type information in the selected scheme register selects one of a plurality of access types including a read access type and a write access type.

16. The method of claim 11, wherein the instruction further selects a second selected scheme register from a second plurality of scheme registers, the method further comprising:
(a) accessing the second selected scheme register to obtain an indirect address register selector that selects a second selected indirect address register from a second plurality of indirect address registers;
(b) accessing the second selected indirect address register to obtain a second address pointer stored therein; and
(c) accessing the memory using the second address pointer.

17. The method of claim 16, wherein the instruction comprises a multiply-accumulate (MAC) instruction.

18. The method of claim 17, wherein the instruction comprises a dual MAC instruction configured to concurrently perform two MAC operations, the dual MAC instruction further selecting third and fourth selected scheme registers from third and fourth pluralities of scheme registers, respectively, the method further comprising:
(a) accessing the third selected scheme register to obtain an indirect address register selector that selects a third selected indirect address register from a third plurality of indirect address registers;
(b) accessing the fourth selected scheme register to obtain an indirect address register selector that selects a fourth selected indirect address register from a fourth plurality of indirect address registers;
(c) accessing the third selected indirect address register to obtain a third address pointer stored therein;
(d) accessing the fourth selected indirect address register to obtain a fourth address pointer stored therein;
(e) accessing the memory using the third address pointer; and
(f) accessing the memory using the fourth address pointer.

19. A circuit arrangement, comprising:
(a) a data memory including X and Y memory spaces;
(b) a first plurality of indirect address registers, each configured to store an address pointer to a memory address in the X memory space;
(c) a second plurality of indirect address registers, each configured to store an address pointer to a memory address in the Y memory space;
(d) a first plurality of scheme registers, each configured to store an indirect address register selector that selects a first selected indirect address register from the first plurality of indirect address registers;
(e) a second plurality of scheme registers, each configured to store an indirect address register selector that selects a second selected indirect address register from the second plurality of indirect address registers;
(f) a multiply-accumulate (MAC) unit coupled to the X and Y memory spaces;
(g) an instruction decoder coupled to the MAC unit and configured to receive a multiply-accumulate (MAC) instruction that selects a first selected scheme register from the first plurality of scheme registers and a second selected scheme register from the second plurality of scheme registers; and
(h) an address generation unit coupled to the instruction decoder and configured to generate first and second memory addresses for use in respectively accessing the X and Y memory spaces, the address generation unit configured to generate the first memory address from the address pointer stored in the first selected indirect address register selected by the indirect address register selector stored in the first selected scheme register, and the address generation unit configured to generate the second memory address from the address pointer stored in the second selected indirect address register selected by the indirect address register selector stored in the second selected scheme register.

20. The circuit arrangement of claim 19, further comprising:
(a) a third plurality of indirect address registers, each configured to store an address pointer to a memory address in the X memory space;
(b) a fourth plurality of indirect address registers, each configured to store an address pointer to a memory address in the Y memory space;
(c) a third plurality of scheme registers, each configured to store an indirect address register selector that selects a third selected indirect address register from the third plurality of indirect address registers;
(d) a fourth plurality of scheme registers, each configured to store an indirect address register selector that selects a fourth selected indirect address register from the fourth plurality of indirect address registers; and
(e) a second multiply-accumulate (MAC) unit coupled to the X and Y memory spaces;

wherein the instruction decoder is coupled to the second MAC unit, wherein the MAC instruction further selects a third selected scheme register from the third plurality of scheme registers and a fourth selected scheme register from the fourth plurality of scheme registers, and wherein the address generation unit is further configured to generate third and fourth memory addresses for use in respectively accessing the X and Y memory spaces, the address generation unit configured to generate the third memory address from the address pointer stored in the third selected indirect address register selected by the indirect address register selector stored in the third selected scheme register, and the address generation unit configured to generate the fourth memory address from the address pointer stored in the fourth selected indirect address register selected by the indirect address register selector stored in the fourth selected scheme register.

* * * * *